March 29, 1955 T. KONECNY 2,704,989
MULTIPLE PURPOSE AMPHIBIOUS MILITARY TRAILER VEHICLE
Filed Feb. 11, 1952 5 Sheets-Sheet 1
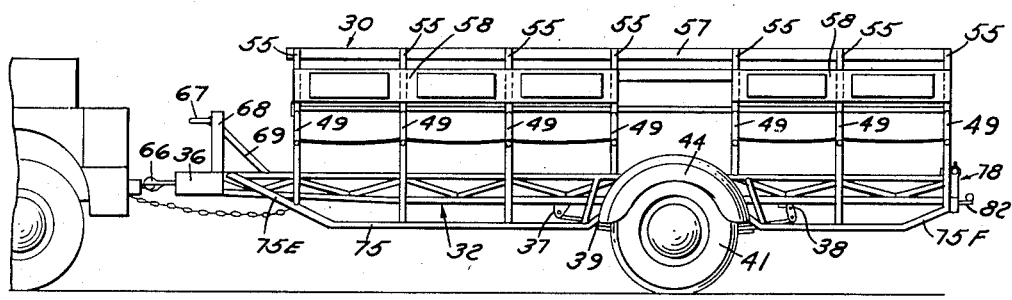
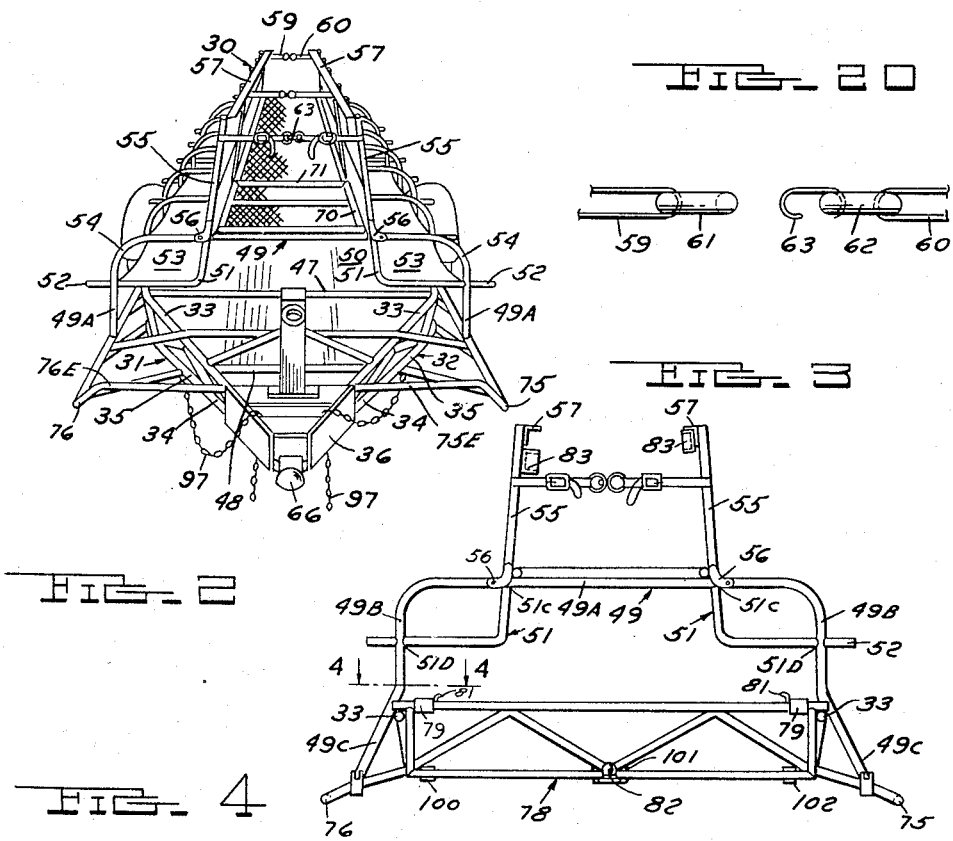
INVENTOR.
THEODORE KONECNY
BY
ATTORNEY

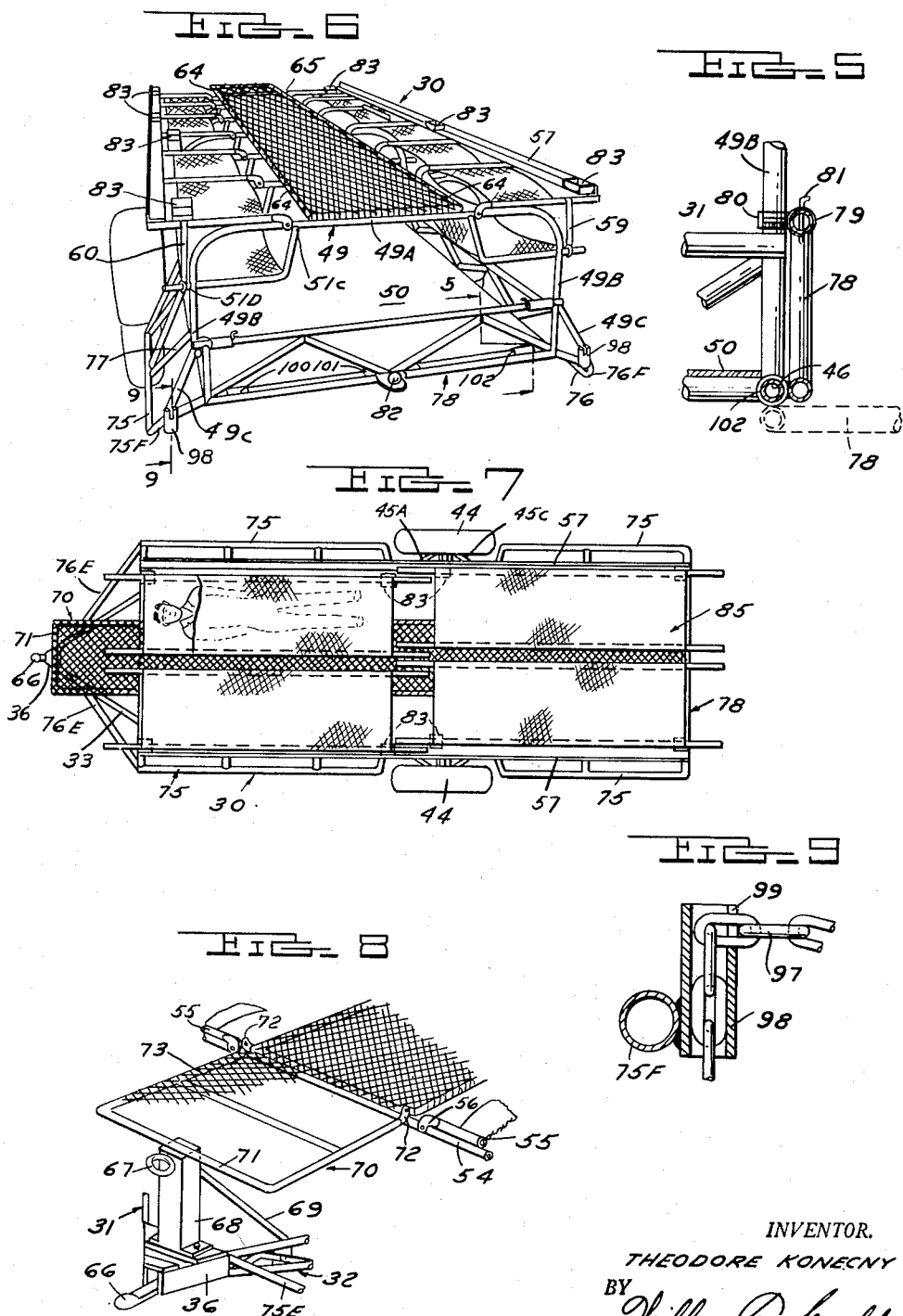

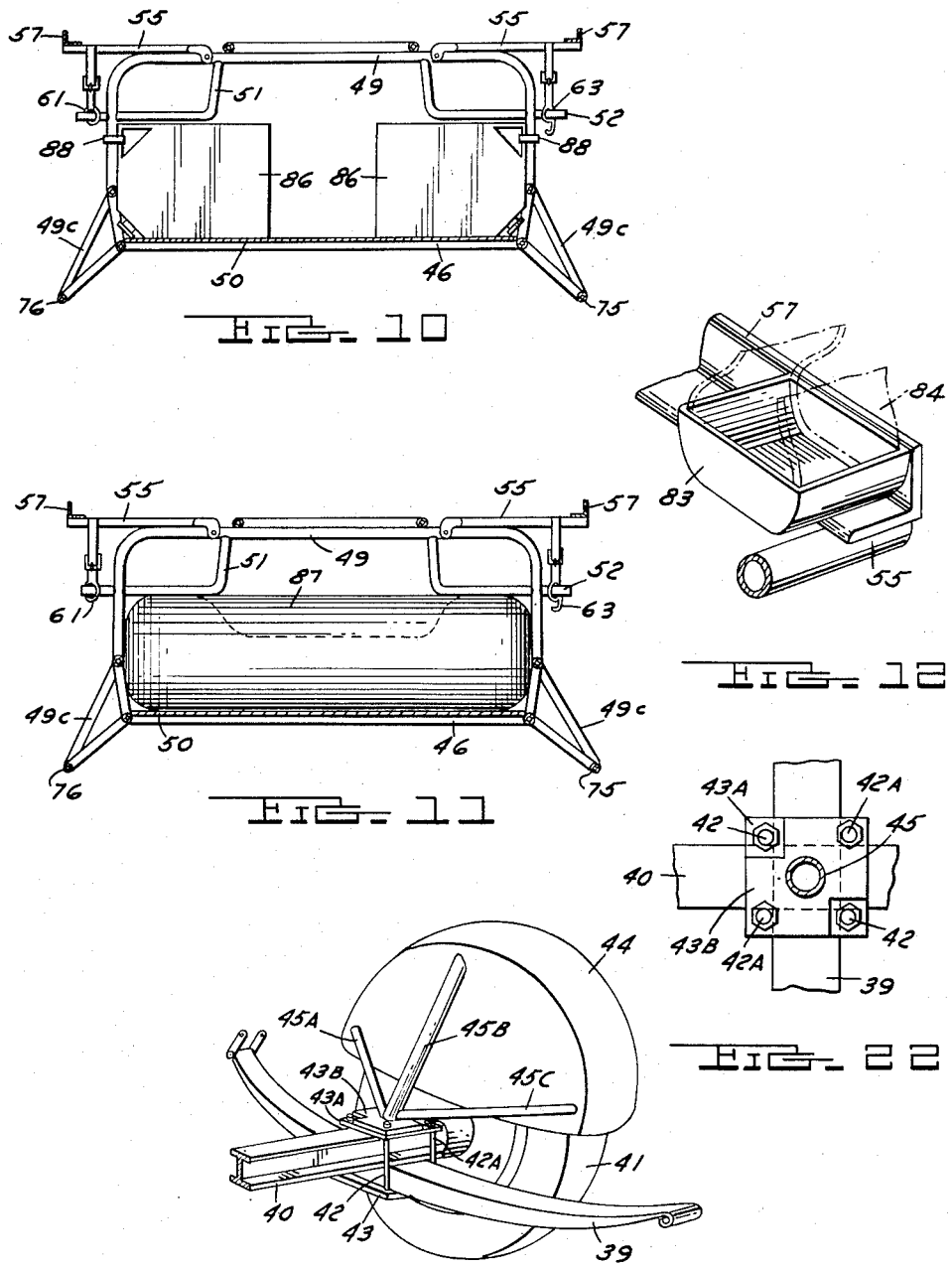

March 29, 1955  T. KONECNY  2,704,989
MULTIPLE PURPOSE AMPHIBIOUS MILITARY TRAILER VEHICLE
Filed Feb. 11, 1952  5 Sheets-Sheet 4

INVENTOR.
THEODORE KONECNY
BY
ATTORNEY

March 29, 1955     T. KONECNY     2,704,989
MULTIPLE PURPOSE AMPHIBIOUS MILITARY TRAILER VEHICLE
Filed Feb. 11, 1952     5 Sheets-Sheet 5
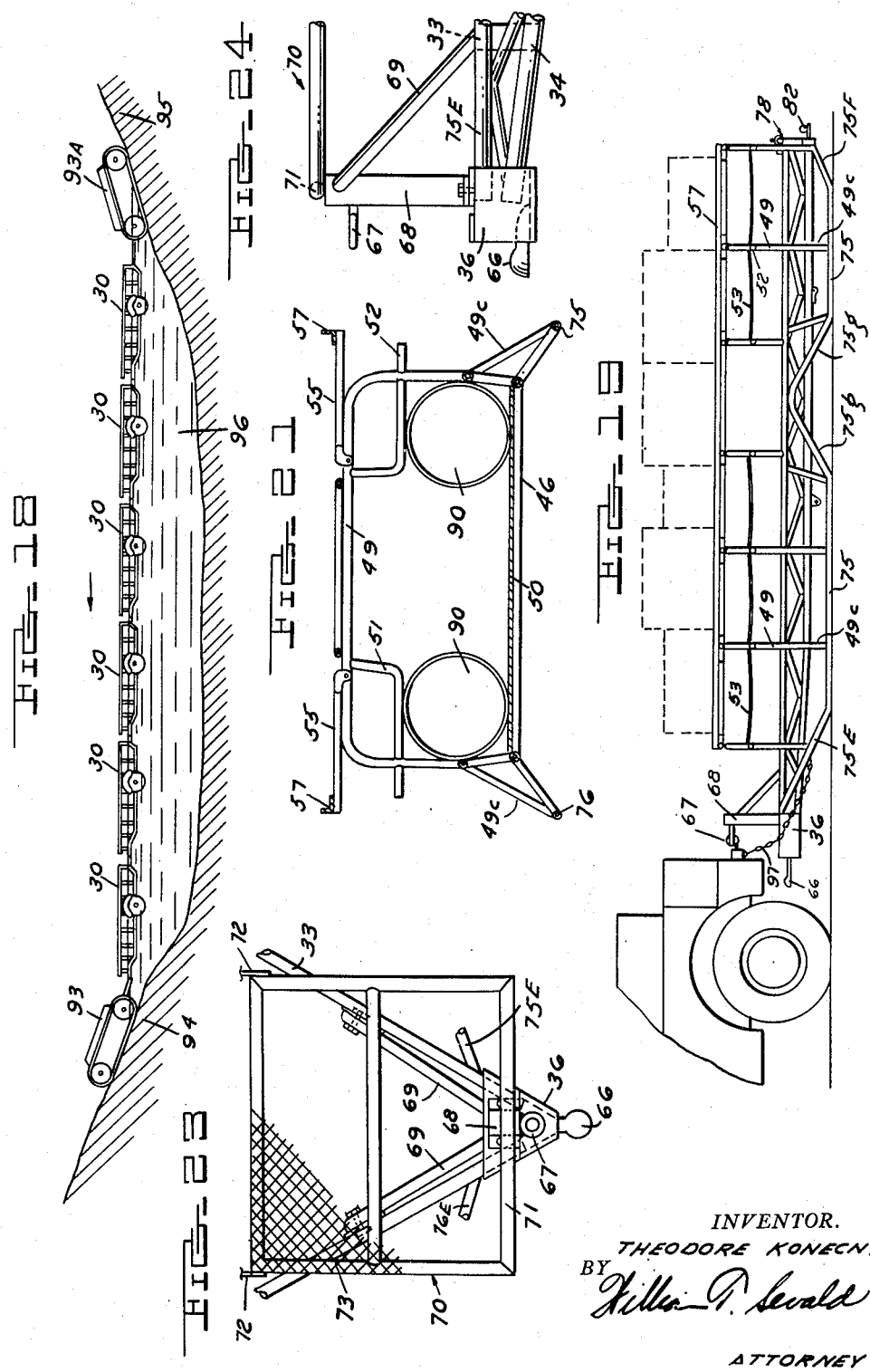
INVENTOR.
THEODORE KONECNY
BY
ATTORNEY

United States Patent Office 2,704,989
Patented Mar. 29, 1955

2,704,989

MULTIPLE PURPOSE AMPHIBIOUS MILITARY TRAILER VEHICLE

Theodore Konecny, Saginaw, Mich.

Application February 11, 1952, Serial No. 270,945

13 Claims. (Cl. 114—.5)

This invention relates to a personnel-carrying semi-trailer vehicle and bridge component and in particular to such a vehicle capable of ordinary transport, entrain-transport, ambulance transport, and bridge construction. Due to such multiple use, the vehicle is hereinafter referred to as a Batt: bridge-ambulance-transport-train. The "Batt" is particularly suitable for military purposes, and, as military use provides employment of the Batt's structure for full use potential, the Batt is hereinafter disclosed and described in conjunction with military use, but not by way of limitation, as the Batt is desirable and useful for many civilian purposes.

It is well recognized that the modern army ground force is well supplied with prime moving equipment such as trucks, tanks, self-propelled guns, weapons carriers, armored cars, and jeeps. It is also well recognized that these prime movers possess a moving ability in excess of their inertia requirements. It is also well recognized that these prime movers do not provide sufficient personnel carrying capacity to carry the ground-forces walking-infantry, and, that the speed of movement of the walking infantry reduces the speed of movement of the whole effective force to the level of the walking personnel.

With the foregoing in view, it is the primary object of this invention to provide light, mobile, vehicular means capable of multiple purpose use as an auxiliary or supplement to self-propelled vehicular means to move more personnel and equipment without overtaxing the prime movers.

An object of the invention is to provide a prime mover trailer which is very light, which is very easily drawn, which is relatively very inexpensive, which is capable of carrying a relatively large number of persons, and/or baggage, and which is capable of varied purpose use.

An object of the invention is to provide a personnel carrier which is easily and quickly connected-to and disconnected-from a prime mover such as by one man.

An object of the invention is to provide a personnel carrier which is easily and quickly mounted and dismounted by the personnel themselves.

An object of the invention is to provide a vehicle which is capable of trailing a prime mover.

An object of the invention is to provide vehicles which are capable of trailing one another such as the cars of a railroad train so that one prime mover can draw several Batts.

An object of the invention is to provide a sitting position personnel carrier which is quickly and efficiently convertible to a litter or prone-position carrier and vice versa.

An object of the invention is to provide a vehicle which is quickly and efficiently rendered amphibious for use by itself, with other Batts entrain, and/or with an amphibious prime mover.

An object of the invention is to provide a vehicle which is usable in mechanized assaults.

An object of the invention is to provide Batts rendered amphibians entrain to form a ponton-bridge in itself.

An object of the invention is to provide a vehicle capable of being rendered amphibious by means of using pontons, rubber boats, water cans or gasoline cans or tanks which are already available to the ground forces.

An object of the invention is to provide a vehicle convertible to moving on ice or snow by merely removing the wheels.

An object of the invention is to provide a vehicle which is capable of using light tubing in its manufacture.

An object of the invention is to provide a vehicle capable of attachment to various prime movers having high and low pintles or towing connections at different levels.

An object of the invention is to provide high and low lunettes so that the vehicle can be drawn with or without wheels.

An object of the invention is to provide a vehicle which can be reduced to a symmetrical rectangular shape for shipping by merely removing the wheel assemblies and dropping the seat backs.

An object of the invention is to provide a bridge catwalk on the vehicle which is usable as a luggage, goods, or equipment rack when not used as a bridge component.

An object of the invention is to provide a retractable catwalk extension for spanning the tongue portion of the Batt when integrated entrain and/or as a bridge.

An object of the invention is to provide a vehicle suitable for conveying relatively large numbers of personnel with relatively small prime mover power such as on airports with motor scooters and the like.

An object of the invention is to provide a vehicle which can be evacuated immediately sidewise outwardly by personnel in the event of a sudden or surprise attack by the enemy.

An object of the invention is to provide a vehicle of such characteristics that each individual person riding thereon can directly leave the vehicle to take shelter on the ground without waiting for other persons to leave the vehicle.

An object of the invention is to provide a vehicle where all personnel can leave the vehicle simultaneously.

These and other objects of the invention will become apparent by reference to the following description of a Batt embodying the integrated inventions taken in connection with the accompanying drawings in which:

Fig. 1 is a side elevational view of the Batt attached to a jeep by its bottom lunette with the seat backs up for carrying sitting personnel.

Fig. 2 is a front perspective view of the Batt from a point above same.

Fig. 3 is a partial rear elevational view of the Batt as seen in Fig. 1.

Fig. 4 is a detail cross-sectional view of Fig. 3 taken on the line 4—4 thereof.

Fig. 5 is a detail cross-sectional view of the Batt showing the tail gate taken on the line 5—5 of Fig. 6.

Fig. 6 is a rear oblique perspective view of the Batt showing the seat backs down from a point above same.

Fig. 7 is a top plan view of the Batt with the seat backs down and litters positioned thereon.

Fig. 8 is a front detail portion in top perspective showing the catwalk extension in extended supported condition.

Fig. 9 is a cross-sectional detail view showing the safety chain quick attachment and release.

Fig. 10 is a transverse cross-sectional view of a Batt equipped with cans for buoyancy.

Fig. 11 is a view similar to Fig. 10 showing a rubber boat used for buoyancy.

Fig. 12 is a detail perspective view of the litter-bag socket.

Fig. 13 is a partial perspective view of the axle, spring, wheel, and fender assembly.

Figure 14:
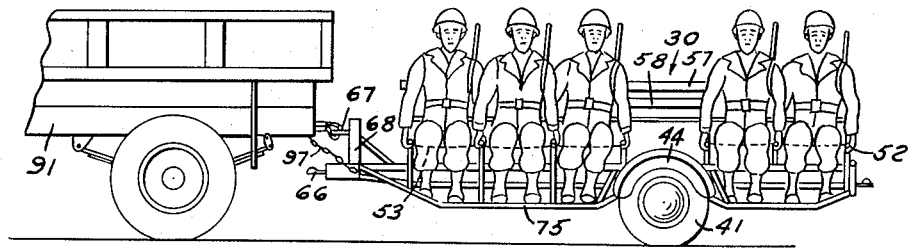
Fig. 14 is a side elevational view of the Batt drawn by a truck at its top lunette carrying personnel in sitting position.

Fix. 17 is a side elevational view of Batts entrain being drawn by an amphibious assault vehicle on water as in an attack.

Fig. 18 is a side elevational view of Batts entrain forming a ponton-bridge across the water with a drawing vehicle on one end and a snubbing vehicle on the other end to prevent jackknifing and to provide bridge anchoring means on both ends.

Fig. 19 is a side elevational view of a Batt being drawn on snow with its wheels removed.

Fig. 20, Sheet 1, is a detail of the hold-down strap configuration.

Fig. 21 is an elevational view of a modification showing integrated liquid or air tanks.

Fig. 22, Sheet 3, is a partial top elevational view of Fig. 13 showing the attaching means in more detail.

Fig. 23 is a top elevational detail view of the top lunette attaching and support means; and Fig. 24 is a side elevational view of the portion of the device seen in Fig. 23.

Referring now to the drawings, Sheets 1 and 2, wherein like numerals refer to like and corresponding parts throughout the several figures, the Batt 30 shown therein to illustrate the integrated invention comprises a frame right side member 31, a frame left side member 32; said side members 31 and 32 each comprising a top rail 33 and a bottom rail 34 interconnected by the struts 35; the side members 31 and 32 are turned inwardly adjacent the front portion of the Batt 30 to form a tongue portion apexing in the triangular hitch supporting tongue member 36; the components 31 and 36 are connected to each other by welding, bolts and nuts, and/or other suitable means. Front spring shackle brackets 37 are welded to the bottom portion of the side members 31 and 32 intermediate their length and spring shackle brackets 38 are welded to the side members 31 and 32 in spaced relation rearwardly of the shackles 37, springs 39 are connected between the brackets 37 and 38 and in turn connected to the axle 40, which, in turn, journals the wheels 41. It is to be noted that the bolts 42 cooperate with the plates 43, 43A, and 43B in securing the axle 40 to the springs 39 and that the fender 44 is supported by the plate 43 via the arms 45A, 45B, and 45C. It can now be seen that the wheels 41 support the Batt 30 via the axle 40, springs 39, and frame side members 31 and 32.

Relative to the wheel and axle mounting, Figs. 13 and 22, the bolts 42, plate 43, and plate 43A are first secured by nuts to unite the axle 40 with the springs 39 and it will be noted that the bolts 42 are in opposite cross-wise corners of the plates 43 and 43A. The plate 43B to which the fender braces 45A, 45B, and 45C are welded is then positioned over the plate 43A and the nuts tightened on the bolts 42A annexing the plate 43B and the fender 44. The cut out corners of the plate 43B fit around the nuts on the bolts 42. This facilitates assembly and disassembly of the device.

The frame side members 31 and 32 are cross-connected via braces 46, 47, 48, and spanners 49 at various intervals. The braces 46, Fig. 10, and 48, Fig. 2, interconnect the bottom portions of the side members 31 and 32 at regular intervals and are covered by a sheet metal pan 50 so that various articles can be carried thereon as hereinafter more fully described.

It is to be noted, Figs. 2 and 3, that the spanners 49 are spread U-shaped and are connected at a point above their ends to the top rail 33 of the side members 31 and 32 in spanning relation to the side members 31 and 32 so that the bow horizontal middle portions 49A of the spanners 49 are on a plane above the side members 31 and 32 and pan 50 and so that the vertical depending intermediate portions 49B of the spanners 49 rise vertically from the side members 31 and 32 and so that their outwardly angled end portions 49C extend below the side members 31 and 32; and, it is to be noted that the spanners 49, Fig. 1, are positioned at regular spaced intervals. L-shaped seat supports 51 are connected at either side of the spanners 49 to the spanners 49 by welding at the points 51C and 51D with a portion 52 of the long-leg of the support 51 extending outwardly from the vertical portions 49B of the spanner 49. The supports 51 are integrated with each spanner 49 on either side of the vehicle so as to provide support for the slung sheet metal strip 53 which is welded or screwed to the supports 52 to provide a seat for personnel. In this connection, it is to be noted that the spanner 49 adjacent its curved portion 54 constitutes chair-arm portions and that the projecting ends 52 of the supports 51 constitute handgrips. It can now be seen that the members 49, 51, and 53 provide the seat portion of the vehicle.

Posts 55 are hingedly connected as at 56 in parallel rows to the spanners 49 at a point spaced inwardly from the spanner 49 curved portion 54 so that the posts 55 are pivotable from a position seen in Figs. 2 and 3 to a position seen in Fig. 6. The hinged portion 56 of the posts 55 is offset so that each post 55 abuts the spanners 49 endwise in their up position thereby limiting further backward movement as seen in Figs. 2 and 3, and, so that each post 55 abuts the spanner 49 sidewise at the end of downward movement thereby preventing further downward movement as seen in Fig. 6. Each row of posts 55 is longitudinally interconnected by the paired top rails 57 on either side of the vehicle and is also longitudinally interconnected by the metal bands 58 or either side of the vehicle which constitutes the back rest portion of the seat in the up position of the posts 55 and a platform portion in the down position of the posts 55. Interconnecting hold down straps 59 and 60 are provided to hold the post 55 in the up position as seen in Figs. 2, 3, and 20 and are also adapted to hold the posts 55 in the down position as seen in Fig. 6; the straps 59 and 60 are provided with rings 61 and 62 and the ring 62 is provided with a hook 63 for connecting with the ring 61 in the up position of the post 55; whereas, when the posts 55 are in the down position, the rings slipfit over the handgrip projections 52 to hold the posts 55 and connected members in the down position.

Paired connectors 64 longitudinally connect the spanners 49 thereby providing lengthwise rigid interconnection of the spanners 49 and, the connectors 64, in turn, support the expanded metal-web-platform 65 for carrying equipment or for providing a foot platform or catwalk as hereinafter more fully described.

The tongue portion or member 36, Figs. 2, 8, 23, and 24, supports the bottom-coupling portion or lunette 66 in forwardly cantilevered relationship to the Batt 30 and supports the top-coupling portion or lunette 67 in elevated and rearwardly spaced relationship to the lunette 66 via the stand 68 and truss 69. It is to be noted that the frame 70 is equipped with a cross-bar 71 which rests on the stand 68 when folded forwardly on the hinge connection 72 and that the frame 70 is provided with an expanded metal strip web member 73 on its top portion and that the frame 70 folds or pivots from the position seen in Fig. 8 to the position seen in Fig. 2. It is obvious that the truss 71 and stand 68 can be welded or bolted to the Batt as seen in Figs. 2 and 8 and Figs. 23 and 24 respectively.

The runners 75 and 76 on either side of the Batt 30, Figs. 1 and 19, extend from the tongue portion 36 to the rear of the Batt 30 and are welded thereto and on the bottom ends of the spanners 49 outwardly angled end portions 49C and triangulating trusses 77, Fig. 6, are connected between the runners 75 and 76 and the bottom rail 34 of the frame side members 31 and 32. It is to be noted, Fig. 19, that the runners 75 and 76 are equipped with rising front portions 75E and 76E, rising rear portions 75F and 76F, and raised intermediate portions 75G and 76G over the axle 40. The runners 75 and 76 provide a foot rest for personnel sitting on the strips 53 or a snow or ice runner, Fig. 19.

Figure 15:
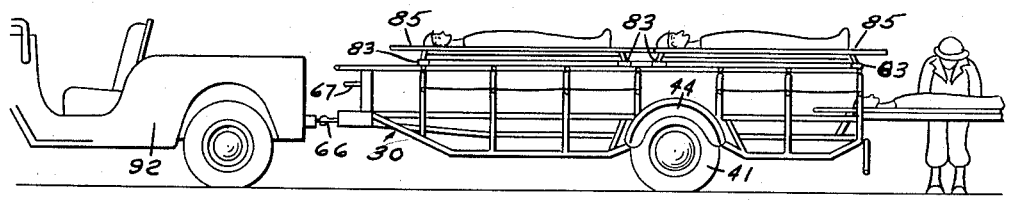
Fig. 15 is a side elevational view of a Batt drawn by a jeep at its bottom lunette with the seat backs down and carrying litters and personnel in prone-position.

The rear of the Batt 30 is equipped with a tail gate 78, Figs. 1, 3, 5, and 6, hingedly connected at its bottom side to the side members 31 and 32 and is adapted to swing from the position seen in Fig. 1 to that of Fig. 15. The gate 78, Figs. 4 and 5, is provided with sliding sleeves 79 and clasps 80 adapted to lock behind the portions 49B of the spanners 49 and to be held in place by cotter pins 81. The gate 78 carries a coupling, hitch, or pintle 82 for hooking Batts entrain as hereinafter more fully described. The gate 78 is hinged on the brace 46 by the sleeves 100, 101, and 102, Figs. 3, 5, and 6, and swings from the position seen in solid lines to the position seen in dotted lines.

When the posts 55 and seat backs are in the down position, the top rails 57, bands 58, and catwalk web 65 constitute a platform upon which to carry equipment or litters and wounded personnel, and, for the purposes of transporting litters, leg sockets 83 are welded to the back of the rails 57 and posts 55, Figs. 3, 6, 7, and 12, so that the legs 84 of the litters 85 can be positioned therein. Suitable hold downs are employed to hold down the litters and the litter personnel.

The space between the floor pan 50 and the platform or catwalk web 65 can be used for baggage, equipment, litters, etc. However, an important purpose of this space is to house empty sealed gasoline or water cans 86 or an inflated envelope or boat 87 or tanks 90, Figs. 10, 11, and 21, to render the Batt buoyant on water and therefore amphibious. The cans can be secured with straps 88 to the spanners 49 and the boat 87 can be wedged or strapped as desired as hereinafter more fully explained.

A modification of the amphibious vehicle is seen in Fig. 21, wherein water or air containing tanks 90 are mounted on either side of the vehicle, such as underneath the seat strip 53. The tanks 90 can be used for carrying water, gasoline, or other liquid on land and can be used for enclosing air on water to render the vehicle buoyant.

Referring to Figs. 14 and 15, it is to be noted that the Batt 30 can be hitched to a truck 91 at its high lunette or coupling member 67 or attached to a low vehicle such as a jeep by its low lunette or coupling member 66. In this connection, it is to be noted that when the hitch 67 is employed on high-bed prime movers, the coupling 67 is so positioned below the bed as not to interfere with same whereas when the lunette or coupling member 66 is employed in conjunction with low bodied vehicles the lunette or coupling member 67 is spaced rearwardly of the prime mover body so as not to interfere with same. When the posts 55, rails 59, and strips 58 are in the up position as seen in Fig. 14, personnel may be seated on the strip 53 so that the runner 75 acts as a foot rest and the projections 52 act as hand grips with the rail 57 and strip 58 acting as a back rest. Whereas, when the posts 55, rails 57, and strips 58 are moved to a horizontal position, they constitute a platform in conjunction with the web platform 65 to provide means for supporting litters, baggage, prone-personnel, etc., or to form a ramp or bridge.

Figure 16:
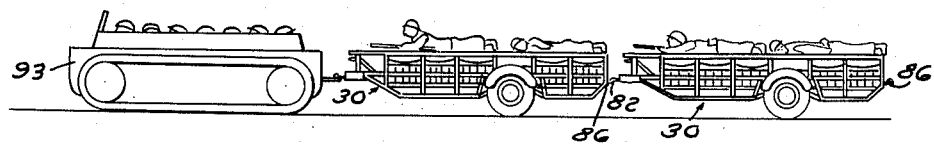
Fig. 16 is a side elevational view of Batts entrain being drawn by an assault vehicle on land as in an attack.
Figure 17:
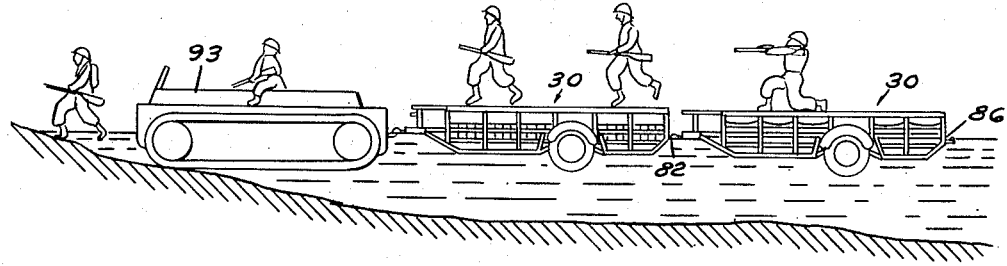

Referring to Figs. 16 and 17, it will be noted that Batts 30 are connected entrain behind an amphibious vehicle 93 and it is to be further noted that the Batts are equipped with water cans 86 to render them buoyant and obviously tanks 90 or ponton 87 can be similarly employed and it is to be noted, Fig. 17, that the platform members 65, 57, and 58 provide a platform spaced above the water surface for carrying personnel in a dry condition. Batts 30 are therefore capable of acting in conjunction with the vehicle 93 as an assault vehicle on land and water.

Referring to Fig. 18, several amphibious Batts 30 are shown disposed entrain between two amphibious vehicles 93 and 93A with vehicle 93 being on one shore 94 of the body of water and the vehicle 93A being on the other shore 95 of the body of water with the Batts 30 disposed between the vehicles 93A in the nature of a ponton bridge; the platform 65 and extension 70 thereof comprising a substantially continuous catwalk for personnel across the body of water 96. In this connection, it is important to note that the train of vehicles and Batts can be entirely integrated on land and moved to and across the body of water at almost any desired point. As personnel can be positioned on the Batts 30 on land prior to the approach to the body of water, upon the vehicle 93 grounding on the shore 94, the personnel can immediately invade the shore 94 and reinforcing personnel on the shore 95, such as the main body of troops, can use the Batt 30 bridge to follow immediately behind the troops initially carried by the Batts 30.

Referring to Fig. 19, wherein the wheel assembly is removed from the Batt 30, such as when the ground is covered with snow or ice, the runners 75 and 76 slide on the snow or ice. Obviously, the Batt 30 with the wheels removed is capable of use on snow for any purpose that the Batt 30 could be used for on land with the wheel assemblies annexed.

Relative to connecting the Batts to a prime mover or to each other, it is to be noted that they are equipped with safety chains 97, Figs. 2 to 9, which are attachmentwise adapted to the prime mover in the usual fashion and hooks may be provided on the ends of the chains if desired. However, it is preferable to furnish sockets 98, Fig. 9, on the back of the prime mover and on the back of each Batt so that the chains may be quickly adjustably connected and quickly released as by dropping the chain 97 through the tubular socket 98 and disposing of the chain 97 in the slot 99 at the desired point on the chain. The chains can be secured, if desired, in the adjusted position by knotting the lower end of the chain.

For trans oceanic shipping the wheel assemblies are removed from the Batts and the seat backs collapsed so that the frame assumes a rectangular shape which is easily crated and stowed. The wheels 41, axle 40, fenders 44, and springs 39 are separated and placed or wired on the pan 50 so that the knock down package is complete in all details.

Although but a single embodiment of the invention has been shown and described in detail, it is obvious that many changes may be made in the size, shape, detail, combinations, and arrangements of the elements of the invention within the scope of the appended claims.

I claim:

1. A drawn, convertible multi-purpose vehicle comprising a frame, side members on said frame, wheel assemblies connected to said frame adapted to support said frame and a load thereon and to provide anti-friction mobility relative to the ground, a tongue portion on said frame, a coupling portion on said tongue for connecting the vehicle to a prime mover coupling portion for drawing the vehicle, substantially spread inverted U-shaped spanner members having a middle bow portion bridging said frame from side-to-side at spaced intervals and connected to said frame side members at a point at either end of said spanner members so that said spanner member ends extend below said frame side members and the middle bow portion of said spanners is disposed on a plane above said frame, substantially L-shaped supports connected to said spanners by welding the short leg thereof to said spanner bow portion and the long-leg thereof to said spanner vertical portion so that said support lies looped below the said spanner bow portion adjacent said spanner vertical portion with said support long-leg portion lying in a horizontal plane between said spanner and said frame, and a continuous panel resting on each of said leg portions and secured thereto and of a width to provide a seat bottom between each of the support leg portions; said panel constituting a seat and said spanner portions adjacent thereto constituting chair arms.

2. In a device as set forth in claim 1, runners disposed substantially parallel to the sides of said frame on a plane below said frame connected to said spanner member ends depending below said frame; each said runners constituting a foot rest in conjunction with the seat constituted by said strip.

3. In a device as set forth in claim 1, said coupling portion on said tongue being disposed on a level with said frame and cantilevered forwardly of said tongue portion for hitching the vehicle to prime movers having relatively low coupling portions, and a second coupling portion on said tongue portion disposed on a level above said frame for hitching the vehicle to prime movers having relatively high coupling portions.

4. In a device as set forth in claim 3, said second coupling portion being disposed rearwardly and upwardly relative to said first coupling portion so that said second coupling portion is located so as to avoid the body of the prime mover to which said first coupling portion is hitched at a point behind the prime mover body, and said first coupling portion being disposed forwardly and downwardly relative to said second coupling portion so that said first coupling portion is located so as to avoid the body of a prime mover to which said second coupling portion is hitched at a point below said prime mover body.

5. A drawn, convertible multi-purpose vehicle comprising a frame, side members on said frame wheel assemblies connected to said frame adapted to support said frame and a load thereon and to provide anti-friction mobility relative to the ground, a tongue portion on said frame, a coupling portion on said tongue for connecting the vehicle to a prime mover coupling portion for drawing the vehicle, substantially spread inverted U-shaped spanner members having a middle bow portion bridging said frame from side-to-side at spaced intervals and connected to said frame side members at a point at either end of said spanner members so that said spanner member ends extend below said frame side members and the middle bow portion of said spanners is disposed on a plane above said frame, substantially L-shaped supports connected to said spanners by welding the short leg thereof to said spanner bow portion and the long-leg thereof to said spanner vertical portion so that said support lies looped below the said spanner bow portion adjacent said spanner vertical portion with said support long-leg portion lying in a horizontal plane between said spanner and said frame, a continuous panel resting on each of said leg portions and secured thereto and of a width to provide a seat bottom between each of said support leg portions; said panel constituting a seat and said spanner portions adjacent thereto constituting chair arms; runners disposed substantially parallel to the sides of said frame on a plane below said frame connected to said spanner member ends depending below said frame; each said runners constituting a foot rest in conjunction with the seat constituted by said strip; posts hingedly connected to said spanners in their horizontal bow portion at a point behind a vertically extended line from the inside of said strip adapted to be disposed in substantially vertical position or a substantially horizontal position, and a band connected between said posts constituting a back rest when said posts are vertically disposed and constituting a platform when said posts are horizontally disposed.

6. In a device as set forth in claim 5, projecting portions on said support long-leg portions constituting handgrips in relation to said strip, runner, and band when said posts are vertically disposed and constituting hold down pegs to which said posts may be secured when said posts are horizontally disposed.

7. In a device as set forth in claim 5, a platform disposed on said spanners in the bow portion thereof between the backs of said posts constituting a floor for baggage, personnel and litters.

8. In a device as set forth in claim 7, a pan on said frame constituting a sub-floor relative to said platform for supporting baggage, litters, and media for rendering the vehicle buoyant.

9. In a device as set forth in claim 8, at least one buoyant member disposed between said pan and said platform rendering said vehicle buoyant relative to water.

10. A vehicle of the class described comprising a frame, seats positioned on either side of said frame in spaced back-to-back relationship facing sidewise outwardly on either side of said vehicle, runners attached to either side of said frame providing a foot rest in conjunction with said seats; said runners being capable of sliding on snow or ice; a wheel assembly detachably attached to said frame to provide anti-friction mobility on ground, seat backs on said frame in conjunction with said seats convertible from an up, substantially vertical seat back position relative to said seats to a down, substantially horizontal platform position over said seats, and a central lengthwise platform on said frame between said seat backs and said seats substantially on a level with said seat backs in their horizontal platform position adapted to support litters and other items in conjunction with said seat backs in their down position and to constitute a baggage rack between said seat backs in their up position.

11. In a vehicle as set forth in claim 10, tanks disposed below said platform for carrying liquid therein on land and for containing air therein on water to render the vehicle buoyant on water.

12. In a vehicle as set forth in claim 10, a pan on said frame spaced below said platform constituting a sub-platform relative to said platform and said seat backs in their down platform position; said pan and the space above said pan providing means for carrying lighter than water mediums to render said vehicle buoyant relative to water.

13. In a vehicle as set forth in claim 12, a ponton disposed between said pan and said platform; said platform and seat backs in down position constituting a ceiling relative to said ponton and a catwalk for personnel when said vehicle is employed on water.

References Cited in the file of this patent

UNITED STATES PATENTS

| | | |
|---|---|---|
| 612,352 | Lane | Oct. 11, 1898 |
| 1,276,667 | McDonald | Aug. 20, 1918 |
| 1,287,855 | Brand | Dec. 17, 1918 |
| 1,990,328 | Jett | Feb. 5, 1935 |
| 2,321,677 | Higgins | June 15, 1943 |
| 2,380,557 | Terry | July 31, 1945 |
| 2,386,132 | McLarty | Oct. 2, 1945 |

FOREIGN PATENTS

| | | |
|---|---|---|
| 56,454 | Switzerland | Apr. 28, 1911 |